United States Patent [19]

Persi

[11] 4,400,404
[45] Aug. 23, 1983

[54] FOOD PRODUCT AND METHOD OF PREPARING SAME

[76] Inventor: John Persi, 323 Bella Vista Dr., Grand Blanc, Mich. 48439

[21] Appl. No.: 330,181

[22] Filed: Dec. 14, 1981

Related U.S. Application Data

[63] Continuation of Ser. No. 642,154, Dec. 18, 1975, abandoned.

[51] Int. Cl.³ .............................................. A21D 8/02
[52] U.S. Cl. ...................................... 426/549; 426/92; 426/94; 426/523; 426/524
[58] Field of Search ................. 426/94, 549, 556, 557, 426/92, 100, 523, 524

[56] References Cited

U.S. PATENT DOCUMENTS

| | | | |
|---|---|---|---|
| 2,365,349 | 12/1944 | MacManus | 426/549 |
| 2,855,305 | 10/1958 | Cella | 426/549 |
| 3,615,678 | 10/1971 | Tangel et al. | 426/549 |
| 3,892,868 | 7/1975 | Klinger | 426/94 |

OTHER PUBLICATIONS

Sultan, *Practical Baking*, AVI Publishing Co., Inc., 300-305 (1965).
*Sunset Italian Cook Book*, Lane Brothers, Menlo Park, California, 72, Apr. 3, 1975.

*Primary Examiner*—Esther M. Kepplinger
*Attorney, Agent, or Firm*—Gifford, VanOphem, Sheridan & Sprinkle

[57] ABSTRACT

A food product and a method of preparing the same in which a rectangularly shaped piece of dough of a predetermined consistency is provided with a paste-like filling on one side thereof. A portion of the rectangularly shaped dough is folded on its short edges over the filling to bring the longer edges thereof into abutment, whereupon a suitable crimping means seals the open edges for maintaining the paste-like filling sandwiched within the dough. The short edges of the folded dough are brought together in a circular end to end relationship to form a toroidal-shaped food product. The food product is heated at a predetermined temperature for a predetermined period of time and is subsequently frozen for storage and delivery to the final consumer. The consumer heats the food product at a predetermined temperature for a predetermined period of time prior to consumption thereof.

3 Claims, 6 Drawing Figures

FOOD PRODUCT AND METHOD OF PREPARING SAME

CROSS REFERENCE TO RELATED APPLICATIONS

This is a continuation of application Ser. No. 642,154, filed Dec. 18, 1975 now abandoned.

BACKGROUND OF THE INVENTION

I. Field of the Invention

The present invention relates to food products and a method of preparing the same, and particularly to a frozen, pre-cooked pizza product.

II. Description of the Prior Art

In the past the frozen food industry has provided a variety of food products which are very convenient in use in that they are simply removed from a freezer and placed in an oven and cooked for a predetermined period of time. In the field of frozen pizzas, the product usually consists of a circular or disk-shaped piece of dough in which a variety of ingredients, such as mushrooms, tomato sauce, cheese and the like, are placed thereon. The open-faced pizzas are generally pre-cooked, wrapped in suitable material and then frozen for shipment to the ultimate consumer. Such open-faced pizzas, however, have a tendency to lose some of the flavor and taste and are not of the same quality as pizzas which may be obtained at restaurants and the like, where such pizzas are prepared and consumed in a relatively short period of time.

One of the basic reasons for the loss of flavor and taste in such open-faced pizzas is that the ingredients are not sealed within the dough prior to its first pre-cooking process.

The previously known open-faced pizzas suffer the further disadvantage that when sliced in conventional pie-shaped slices, the individual slices of pizza are relatively awkward to handle due to the limpness of the pizza slices. Thus, unless properly supported, the previously known pizza slices are prone to droop downward so that the pizza ingredients fall onto clothing, the floor, or the like. Needless to say, this problem is particularly prevalent among children.

Certain improvements in the frozen pizza product field have led to food products in which the ingredients are wrapped or sealed in an outer shell and are basically a pastry. Such pastries are expensive to make and therefore are sold only in the form of small, cylindrically shaped pieces and are usually used for the purposes of a snack or hors d'oeuvres. The expense of making such an item prohibits their use in serving a large quantity, such as the hereinbefore described open-faced pizzas.

It would, therefore, be desirable to provide a pizza-like product which can be manufactured in a large size, such as to provide a sufficient quantity to serve a large group of people, yet one that is inexpensive as compared to other food products that are currently on the market, and which does not have the disadvantages of the open-faced pizza in that it lacks flavor and taste.

SUMMARY OF THE INVENTION

The present invention, which will be subsequently described in greater detail, comprises a pre-cooked pizza product and a method for preparing the same. The pizza product is comprised of a rectangularly shaped piece of dough having a predetermined consistency in which the short sides of the rectangularly shaped dough are folded over a paste-like filling to bring the longer edges thereof into abutment. A suitable crimping devices seals the open edges on three sides of the folded dough, whereas the fold on the fourth side provides for a suitable seal for maintaining the paste-like filling sandwiched within the dough. The opposite short ends of the dough are brought together in a circular fashion in an end to end relationship to form a toroidal or doughnut-shaped pizza product. The doughnut-shaped pizza product is then pre-heated for a predetermined period, until the dough is baked to such a degree that the pizza product will retain its shape. The pizza is then packaged and frozen for delivery to the final consumer. The consumer heats the pizza food product at a predetermined temperature for a predetermined period of time prior to consumption thereof.

It is, therefore, an object of this invention to provide a pizza product in which the paste-like filling is completely sealed within the dough prior to heating thereof.

It is also an object of this invention to provide a pizza product which retains its flavor and taste, but which is inexpensive to prepare.

It is a further object of this invention to provide a pizza product which is easy to handle when eating, even for a child.

Other objects, advantages and applications of the present invention will become apparent to those skilled in the art when the accompanying description of one example of the best mode contemplated for practicing the invention is read in conjunction with the accompanying drawing.

DESCRIPTION OF THE DRAWING

The description makes reference to the accompanying drawing wherein like reference numerals refer to like parts and in which.

DESCRIPTION OF THE PREFERRED EMBODIMENT

For the purpose of this disclosure, a pizza will be defined as comprising a piece of dough in combination with cheese and a tomato sauce.

Figure 1:
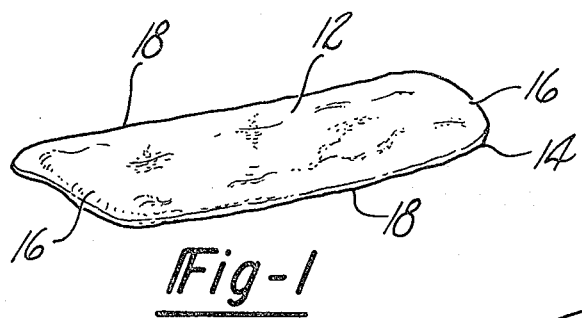
FIG. 1 is a perspective view of a rectangularly shaped piece of dough utilized for preparing a food product in accordance with the present invention.
Figure 6:
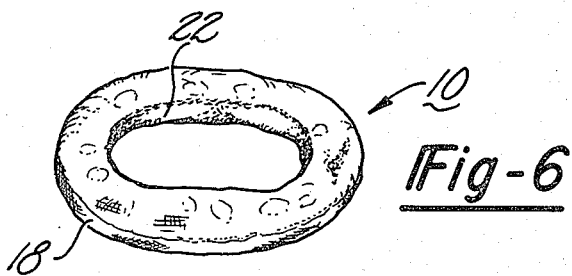
FIG. 6 is a perspective view of the final food product prepared in accordance with the present invention after it has been reheated at a predetermined temperature for a predetermined period of time and is ready for consumption by the user.

Now referring to the drawing for a description of the method utilized in preparing the doughnut-shaped pizza 10 illustrated in its final form in FIG. 6, the first step in preparing the pizza food product 10 consists in shaping a piece of dough 12 into a generally rectangular shape by rolling it in the usual manner. The dough should be of such consistency as to permit easy shaping of the same and is preferably formed at a consistency wherein approximately 10 ounces of dough will form a 24" by 5" rectangular piece having approximately ⅛" thickness. The dough 12 need not be perfectly rectangular and may have rounded ends, such as illustrated at 14 in FIG. 1. The dough 12 must also be of such consistency as to permit the same to be folded about its short edges 16 such that the longer edges 18 will be brought into abutment as will be described in greater detail hereinafter.

Figure 2:
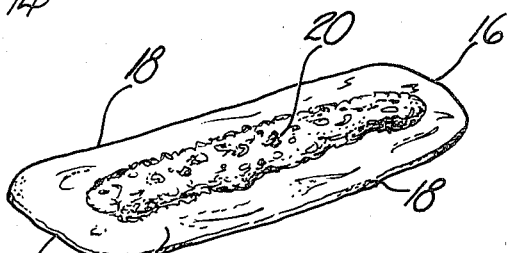
FIG. 2 is a perspective view of the dough illustrated in FIG. 1 in which the ingredients of the food products are placed on one side thereof.

The ingredients 20 of the pizza food product are placed along the central portion of the dough 12, as illustrated in FIG. 2. The ingredients, which are preferably a paste-like mixture of tomato sauce and cheese as previously described, and may also comprise sausage, mushrooms, onions and ham, and any combination of these and may be comprised of other combinations of food, such as pepperoni, ground beef, tuna fish, green peppers, anchovies or bacon, and the like. For the size pizza food product illustrated, approximately 8 to 10 ounces of ingredients should suffice.

The dough 12 is then folded along its longitudinal length such that the long edges 18 are in abutment with each other and the short edges 16 are folded approximately in half, the opposite halves being in abutment. A suitable crimping and cutting device (not shown) presses the abutting edges against each other so as to tightly seal the ingredients 20 within the dough 12 while at the same time severing the excess dough proximate the crimped portions 13 as can best be seen in FIG. 3. This leaves an elongated somewhat cylindrically shaped tightly sealed ingredient-filled dough roll 24. In the example being described the roll 24 is approximately 20 inches long and 2 inches wide, and has a weight of between 16 and 18 ounces, and is illustrated in FIG. 3 with the short edges 16 and long edges 18 crimped to one another, as hereinbefore described.

Care must be taken when folding the dough to bring the long edges 18 together so that cracks are not formed in the dough, particularly where the fold 22 is made, so as to insure that the ingredients will not leak therefrom during the heating process to be described hereinafter.

Figure 3:
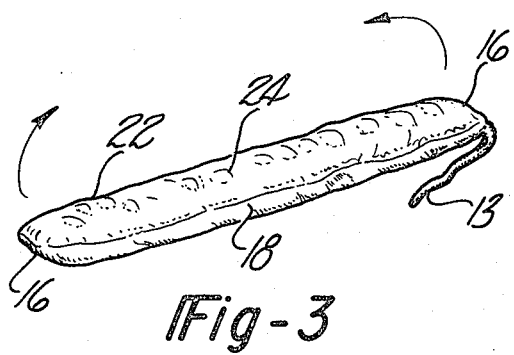
FIG. 3 is a perspective view illustrating the food product after it has been folded and during the crimping and cutting step.
Figure 4:
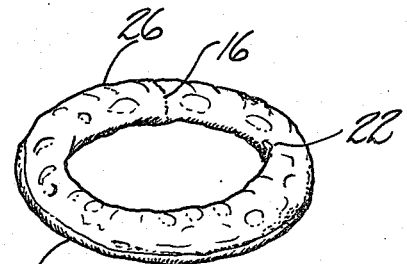
FIG. 4 is a perspective view illustrating the toroidal shape of the food product prepared in accordance with the present invention.

The dough roll 24 is then bent or formed in the direction of the arrows in FIG. 3 to bring the ends into an end to end relationship so as to form a toroidal or doughnut-shaped roll 26 as illustrated in FIG. 4. The dough roll 24 is preferably folded in a circular fashion such that the crimped edges are on the outer periphery of the doughnut-shaped roll 26. The meeting ends of the roll 24 are then firmly joined to each other by means of any suitable crimping device or by pressing the dough together to insure that the pizza maintains its toroidal or doughnut-shape when heated, as hereinafter described. It should be noted that the roll 24 may have been shaped into the doughnut-shape in a manner opposite as hereinbefore described such that the crimped edges would have been on the inner periphery of the doughnut-shaped roll 26. However, it is preferable to have the crimped edges along the outer periphery as this will insure that the fold 22 will not rupture. If the outer crimped edges do rupture upon formation of the doughnut-shape, the same may be readily repaired by means of the crimping device or by pressing the dough together with the fingers at the point of rupture. Such repair is not as easily accomplished on the fold 22.

Figure 5:
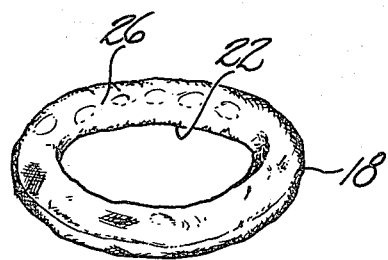
FIG. 5 is a perspective view of the food product illustrated in FIG. 4 after it has been pre-heated for a predetermined period of time.

The toroidal-shaped pizza roll 26 illustrated in FIG. 4, is then placed in a pre-heated oven at approximately 500 degrees and cooked for approximately 5 minutes. Cooking should be just long enough to insure the integrity of the pizza so that the same will not crumble or be deformed during shipping to the consumer. The pre-cooked toroidal-shaped pizza roll 26 is illustrated in FIG. 5. The pizza is then wrapped in suitable packaging material, and frozen so that the same may be shipped and stored for considerable length of time prior to consumption by the ultimate consumer.

When it is desired to consume the pizza, it is then unwrapped from its packaging material and placed in a pre-heated oven at approximately 500 degrees and cooked for approximately 15 minutes. However, the time of cooking will depend upon the personal tastes of the user as to how he prefers the crust to be cooked. The cooked pizza product should be permitted to cool for approximately 5 minutes as the ingredients sealed inside are substantially warm and immediate eating of the cooked pizza results in an uncomfortable burning sensation to the user.

It should be understood that if immediate consumption of the pizza is desired after the same has been formed in the toroidal shape, the initial pre-cooking and freezing steps are eliminated and the pizza is cooked for approximately 15-20 minutes at 500 degrees until the desired crust is obtained.

It is apparent that a novel food product has been described. Although a particular size pizza has been disclosed it is apparent that pizzas of the present disclosure can be fashioned in any desired size from small individual size pizzas to large pizzas suitable for feeding a number of persons. The shape makes the pizzas easy to handle and to eat due to the compact construction of the pizza, and since all of the paste ingredients are on the inside, the pizza can be consumed without utensils such as a fork. Moreover, since the ingredients are contained within the interior of the dough, the ingredients cannot "fall off" a piece of pizza onto clothing or the like as has been previously known. Also, because the ingredients are sealed inside, the pizza can be stored for long periods of time without loss of flavor.

Having thus described the invention, what is claimed is as follows:

1. A method of preparing a pizza comprising:
    shaping a dough of a predetermined consistency into a generally rectangular shape,
    placing tomato sauce and cheese and ingredients selected from the group consisting of pepperoni, ground beef, tuna fish, green peppers, anchovies, bacon, sausage, mushrooms, onions and ham along the length of one side of the rectangularly shaped dough;
    folding the rectangularly shaped dough on its smaller edges over the ingredients to bring the longer edges of the dough and the folded edges into abutment;
    crimping the abutting edges of the dough together to form an elongated rectangularly shaped, filled dough product;
    bringing the smaller sealed edges of said elongated dough product into an end to end relationship and joining the smaller edges together to form the dough product into a toroidal shape so that the interior of said dough product is completely sealed and so that the crimped longitudinal edges of the dough product are positioned around the outer periphery of the toroidal shaped dough product; and heating the toroidal shaped dough product at a predetermined temperature for a predetermined period of time.

2. The method of preparing a food product as defined in claim 1, including freezing said food product for a predetermined period of time after said heating.

3. The method of preparing a food product as defined in claim 2, including reheating at a predetermined temperature for a predetermined period of time after so freezing.

* * * * *